United States Patent [19]

Ogawa et al.

[11] 4,218,654
[45] Aug. 19, 1980

[54] SPACE DIVERSITY SYSTEM IN TDMA COMMUNICATION SYSTEM

[75] Inventors: Akira Ogawa, Machida; Tatsuo Watanabe, Mitaka; Hideki Saito, Tanashi, all of Japan

[73] Assignee: Kokusai Denshin Denwa Kabushiki Kaisha, Tokyo, Japan

[21] Appl. No.: 13,287

[22] Filed: Feb. 21, 1979

[30] Foreign Application Priority Data

Apr. 28, 1978 [JP] Japan .................................. 53-51272

[51] Int. Cl.² ............................................. H04L 7/00
[52] U.S. Cl. ............,.................... 370/97; 370/104; 375/107; 455/12; 455/52
[58] Field of Search ................. 178/69.1; 179/15 AD, 179/15 BS; 325/3, 4, 42, 56, 65; 343/100 ST

[56] References Cited
U.S. PATENT DOCUMENTS

| | | | |
|---|---|---|---|
| 3,418,579 | 12/1968 | Hultberg ................................ 325/4 |
| 3,654,395 | 4/1972 | Schmidt ........................ 343/100 ST |
| 4,107,608 | 8/1978 | Saburi ............................. 179/15 BS |
| 4,129,755 | 12/1978 | Murakami ....................... 179/15 BS |

*Primary Examiner*—Benedict V. Safourek
*Attorney, Agent, or Firm*—Robert E. Burns; Emmanuel J. Lobato; Bruce L. Adams

[57] ABSTRACT

A space diversity system in a TDMA communication system employing a communication satellite, in which in order to equalize the path lengths of respective sending paths at the start of communication, a pre-burst is sent out to one of the paths making up the diversity system in a time slot of one frame assigned to an instant station. A sub-burst is sent out to the other of the paths in the assigned time slot. A relative time difference between the pre-burst and the sub-burst is detected from signals sent back to the instant station from the communication satellite or signals received by a distant terrestral station via the communication satellite. On the basis of the result of a comparison operation of relative time difference between the pre-burst and the sub-burst at the time of their sending-out from the instant station with a relative time difference between the pre-burst and the sub-burst received via the communication satellite, variable delay means inserted in one of the paths is controlled so that the two relative time difference become equal to each other.

2 Claims, 5 Drawing Figures

SPACE DIVERSITY SYSTEM IN TDMA COMMUNICATION SYSTEM

This invention relates to a space diversity system in a PCM-TDMA communication system.

With a recent demand for communications, frequency bands above 10 GHz are now going to come into use as satellite communications. In such high frequency regions, however, attenuation by rain is large to make it difficult to maintain satisfactory transmission quality when it rains. As a solution to this rain attenuation, the space diversity system is effective by the use of localization of a rain area. That is, since a heavy rain is localized upon a relatively narrow area, an excellent diversity effect can be expected if two antenna sites for achieving the space diversity are spaced more than 10 km apart.

In a case of carrying the diversity into practice, however, a distance between the two antenna sites is so large that a difference in path length between paths respectively passing through the two antenna sites includes a fixed path-length difference and a very gently varying path-length difference due to movements of a communication satellite (which is caused by the angle of inclination of an orbit of the communication satellite and its drift). Accordingly, even if signals for diversity are merely switched (or combined), a signal dropout or overlapping is caused by the difference between the both path lengths. Especially in a PCM-TDMA communication system, it is necessary to send the burst of each station in a predetermined time slot in one frame so as to achieve the burst synchronization. Therefore, in the diversity on the sending side, burst synchronizing means is of prime importance.

On the burst synchronizing means of the sending side, some studies have already been made in Japanese Pat. Applns. Nos. 13976/72, 33642/72 and 147602/74.

With the first one of the abovesaid prior applications, sending bursts are individually sent out every n (n=1, 2, 3, ...) frame or frames alternately from two antenna sites, thereby establishing burst synchronization, as a whole, as if the bursts are being sent out from one station. If the transmission quality of the sending route of one of the antenna sites is degraded by rain, a diversity operation takes place to improve the degraded transmission quality by immediately sending out all bursts from the other antenna site only when the rain attenuation of the other sending route is small and its signal quality is good.

With the second application, since the sending path length and the receiving path length from the respective antenna sites to the communication satellite have substantially the same fluctuation (which result from movements of the satellite), a difference between the both receiving path lengths is detected by using received signals from the both antenna sites, and on the basis of the detected path-length difference, a difference between the both sending path lengths is predicted. In the path switching for the diversity operation, the sending-out timing of the sending burst is determined by the use of the predicted value.

With the third application, in order that both receiving path lengths may be equal at the time of signal switching for diversity, a difference between the both receiving path lengths is detected from both received signals, and digital variable circuit or circuits inserted in the both sending paths and the both receiving paths or in one sending path and one receiving path is controlled by using the detected path-length difference to set the path lengths to be the same, and then the diversity operation is carried out.

In a case of the first application, it is necessary to generate the burst synchronization timing by some means when the system is switched from the diversity operation to a non-diversity one. Further, this requires a burst circuit for each antenna site, which makes it difficult to obtain an efficient diversity system.

The second and third applications are excellent in principle, but before the start of operation of the system, it is necessary to accurately measure the path-length difference between the sending path and the receiving path passing through each antenna site. In practice, however, this path-length difference may fluctuate with the lapse of time due to temperature change and so on, and in such a case, the accurate burst synchronization is not done. At any rate, in order to ensure the burst synchronization in the diversity operation, it is necessary that the lengths of the paths passing through the both antenna sites be electrically equalized.

An object of this invention is to provide a space diversity system for a TDMA communication system which facilitates equalization of the path lengths of sending paths respectively passing through two antenna sites, by a sub-burst, and which enables accurate and easy correction of a change in the path-length difference between the both sending paths during operation.

To achieve the above object, this invention comprises means for making the electrical path lengths of the both sending paths equal to each other in the course of initial acquisition operation, and means for maintaining the electrical path lengths of the both paths equal at all times during the operation, whereby the sending burst synchronization can be easily achieved also in the path switching accompanying the diversity operation.

In accordance with this invention, there is provided a space diversity system in a TDMA communication system employing a communication satellite; in which in order to equalize the path lengths of respective sending paths at the start of communication, a pre-burst is sent out to one of the paths making up the diversity system in a time slot of one frame assigned to an instant station; in which a sub-burst is sent out to the other of the paths in the assigned time slot; in which a relative time difference between the pre-burst and the sub-burst is detected from signals sent back to the instant station from the communication satellite or signals received by a distant terrestrial station via the communication satellite; and in which on the basis of the result of a comparison operation of a relative time difference between the pre-burst and the sub-burst at the time of their sending-out from the instant station with a relative time difference between the pre-burst and the sub-burst received via the communication satellite, variable delay means inserted in one of the paths is controlled so that the two relative time differences become equal to each other.

Moreover, after the path length equalization at the start of communication, a signal transmitting burst is sent out to a path in operation in the time slot assigned to the station, while a sub-burst is sent out to a stand-by path of diversity in a sub-burst time slot of the frame for each frame or on a time shared basis. A relative time difference between the signal transmitting burst and the sub-burst is detected from signals sent back to the station via the communication satellite. When the detected relative time difference is different from a predetermined relative time difference between the signal transmitting burst and the sub-burst at the time of their sending-out, variable delay circuit inserted in one of the paths is controlled so that the two relative time differences become equal to each other.

This invention will be described in detail below with reference to the accompanying drawings, in which.

Figure 1:
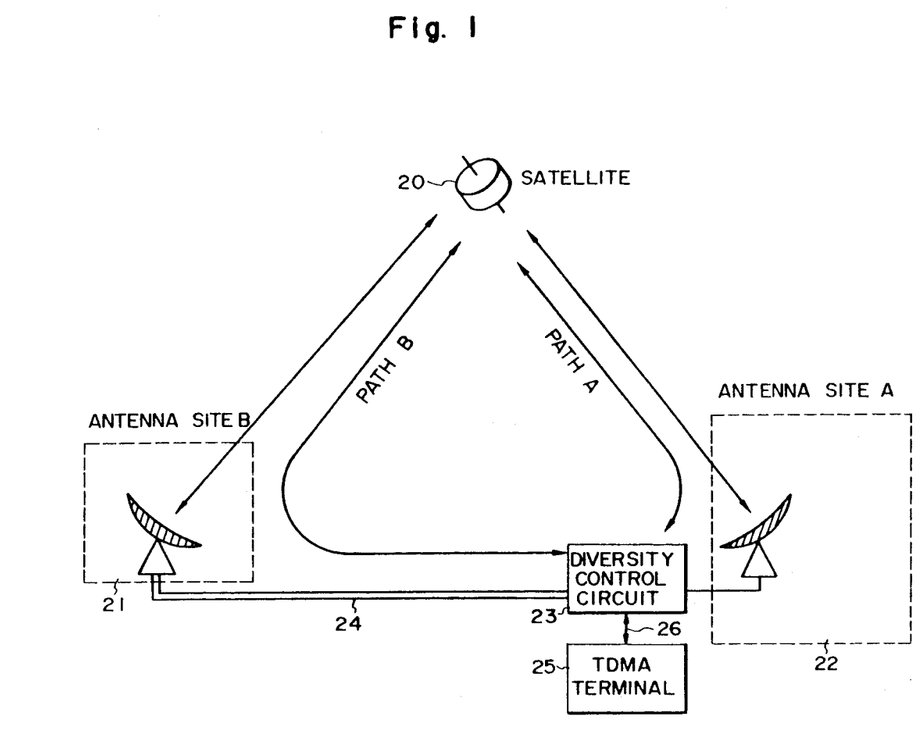
FIG. 1 is a system diagram showing a space diversity system of a satellite communication system to which this invention is applies.

With reference to FIG. 1 showing a TDMA space diversity system of a satellite communication system to which this invention, reference numeral 20 indicates a satellite; 21 designates an antenna site B; 22 identifies an antenna site A; 23 denotes a diversity control circuit; 24 represents a link line; 25 shows a TDMA terminal; and 26 refers to a signal line. A path B indicates a path from the diversity control circuit 23 to the satellite 20 via the link line 24 and the antenna site B, and a path A a path from the diversity control circuit 23 to the satellite 20 via the antenna site A.

Figure 2:
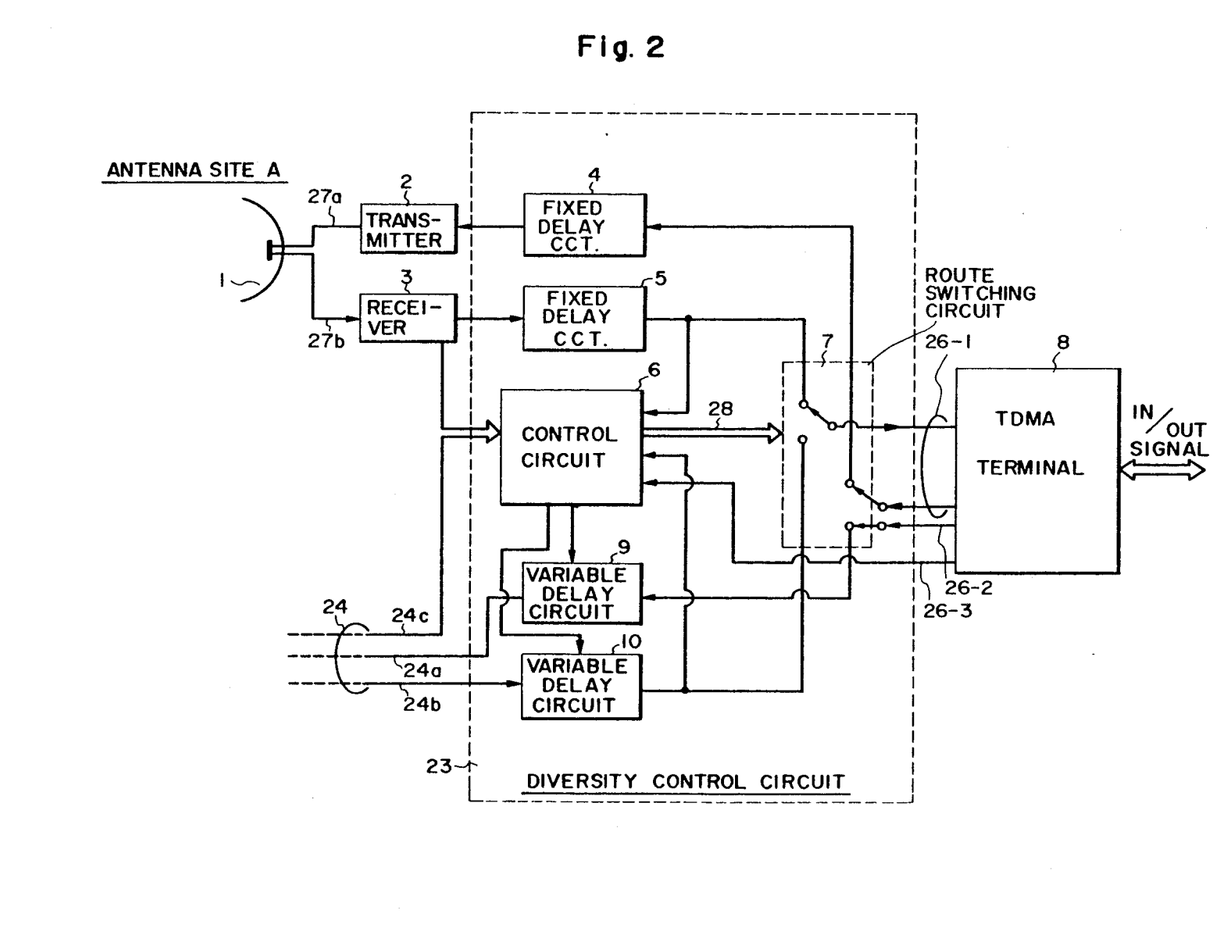
FIG. 2 is a block diagram illustrating an embodiment of this invention.

FIG. 2 illustrates an embodiment of the circuit construction of this invention. In FIG. 2, reference numeral 1 indicates an antenna of the antenna site A; 2 designates a transmitter; 3 identifies a receiver; 4 and 5 denote fixed digital delay circuits; 6 represents a control circuit for controlling the path length; 7 shows a route switching circuit for achieving the diversity operation; 8 refers to a TDMA terminal; 9 and 10 indicate variable delay circuits for controlling the path length of the path B; 23 designates the diversity control circuit 23 in FIG. 1; 26-1 identifies a main signal line; 26-2 denotes a sub-burst sending line; 26-3 represents a burst position information sending line; 27a and 27b show a sending bus and a receiving bus respectively connected to the antenna 1 in the antenna site A; and 24a, 24b and 24c refer to a sending bus and a receiving bus in the link line 24 and a switching signal line. The control circuit 6 applies a route switching signal via the signal line 28 to the route switching circuit 7. In FIG. 2, a sending burst signal from the TDMA terminal is sent out from the antenna 1 to the satellite 20 via a path (A in the illustrated example) selected by the diversity switch circuit 7, the fixed delay circuit 4 and the transmitter 2 of the antenna site A. A burst signal received by the antenna 1 is demodulated by the receiver 3 to a PCM base-band signal and then applied to the TDMA terminal 8 via the fixed delay circuit 5 and the diversity switch circuit 7. The fixed delay circuits 4 and 5 are provided for compensating for a fixed path-length difference between the paths A and B and respectively have delay times obtained by calculation in advance during setting of the system. In the present embodiment, the path length of the path A excluding the link line 24 is made shorter than the path length of the path B. The variable delay circuits 9 and 10 are provided for compensating for fluctuations in the path-length difference between the both paths A and B which are caused by movements of the satellite 20 and path length fluctuations in the link line 24.

Figure 3:
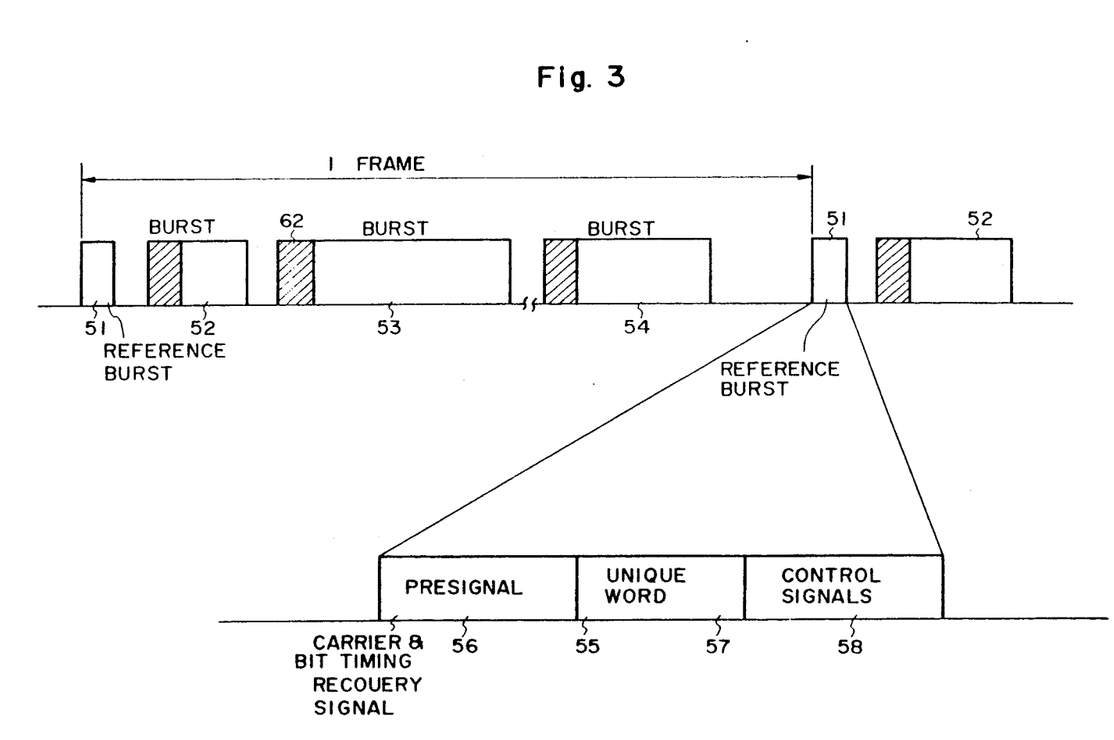
FIG. 3 is a diagram showing an example of a TDMA burst signal for use in this invention.

FIG. 3 shows an example of the configuration of a TDMA burst signal in this invention. In FIG. 3, reference numeral 51 indicates a reference burst signal, and 52, 53 and 54 designate burst signals from different terrestrial stations. The sending timings of these bursts are controlled by the terrestrial stations so that the sent-out bursts may lie at predetermined positions relative to the reference burst signal 51. Of course, FIG. 3 shows a state in which the sending burst synchronization has already been established, and during operation of TDMA, the bursts must be sent out in time slots respectively assigned to the burst sending stations. Reference numeral 55 shows generally the contents of the reference burst signal 51; 56 indicates a pre-signal for carrier recovery and for bit timing regeneration necessary for the demodulation of a PCM signal; 57 designates a reference signal (i.e. a unique word) for burst synchronization; 58 identifies a portion assigned for the sending-out of control signals necessary for the operation of the TDMA system. Means for equalizing the receiving path lengths of the paths A and B detects a specified signal in the same burst from the receiving paths of the both antenna sites, for example, the reference signal for burst synchronization shown in FIG. 3, and the delay of the variable delay circuit 10 is controlled so that the detecting timings are the same at the outputs of the variable delay circuits 5 and 10 in FIG. 2. The delay circuits 5 and 10 used in this example are digital delay circuits, so that in order to delay such a discontinuous signal as a burst signal, it is necessary to add a clock signal to the end of the burst signal for a period of time corresponding to the delay amount of the delay circuit. In practice, however, since the burst signal has not added thereto such a clock signal, a signal converter included in the receiver 3 in FIG. 2 is used for delaying the signal. By the signal converter, clock signals of the received burst signal are replaced by a train of clock pulses of the station. A specific operative circuit construction for this operation is already set forth in detail in Japanese Pat. Appln. No. 147601/74.

Next, a description will be given with respect to a specific operative example of the sending burst synchronization in this invention. The determination of the burst sending timing for the sending burst synchronization is achieved by a burst synchronization circuit included in the TDMA terminal 8. The burst synchronization circuit is one usually employed in PCM-TDMA and performs the sending burst cynchronization using the unique word 57 included in the received signal and, in a case of reception, sends out the unique word detecting timing to the TDMA terminal 8 to provide the timing for the decoding of the received PCM signal. In global beam operations, the received timings of the burst signal 53 sent out of the instant station and the reference burst signal 51 are compared with each other in the receiving side and the burst sending timing is corrected so that the burst signal sent out from the instant station lies in the slot assigned thereto. In a case of spot beam operation, the burst sending timing is determined by measuring the position of the sent-out burst signal of the instant station by a distant station and returning therefrom the measured results.

The above is the sending burst synchronizing means in the operation of the TDMA system. At the start of operation, an approximate burst sending timing must be set so as not interfere with bursts of other stations in operation. This timing is usually set by an initial acquisition device associated with the TDMA terminal 8. That is, by using this device, the approximate sending timing is determined prior to the start of operation. In practice, there are several methods of this type and a typical one of them is to send out a low-speed signal at such a low level as not to interfere with bursts of other operating stations and determine the approximate sending timing from the receiving timing of the low-speed signal. At this time, an accurate sending timing required for the TDMA burst synchronization is still unobtainable. Then, on the basis of this approximate measuring timing, only a preamble burst 62 (the hatched portion in FIG. 3), which is sufficiently shorter than the sent-out burst length, is sent out from the TDMA terminal 8 in the time slot assigned to the instant station. In this case, the preamble burst is sent out in the assigned time slot at a position which is sufficiently spaced away from the beginning of the time slot in consideration of the accuracy of measurement of the initial acquisition unit. In the case of the spot-beam operation, after the preamble burst is received by a distant terrestrial station, the positional information of the preamble burst is sent back, and in the global-beam operation, by receiving the preamble burst by the instant station, the position of the sent-out preamble burst is confirmed. Further, the sent-out preamble burst position of the instant station is sequentially shifted to its normal position while being confirmed by the confirming means and, after completion of this operation, a data part is added to the end of the preamble burst, whereby communication is started.

The above is the initial setting means for the sending burst synchronization in ordinary TDMA communication. In the TDMA diversity, two sending paths exist and, during path switching, the sending burst synchronization must be maintained, and consequently it is necessary that the both sending path lengths are electrically equal at the time of path switching.

Figure 4:
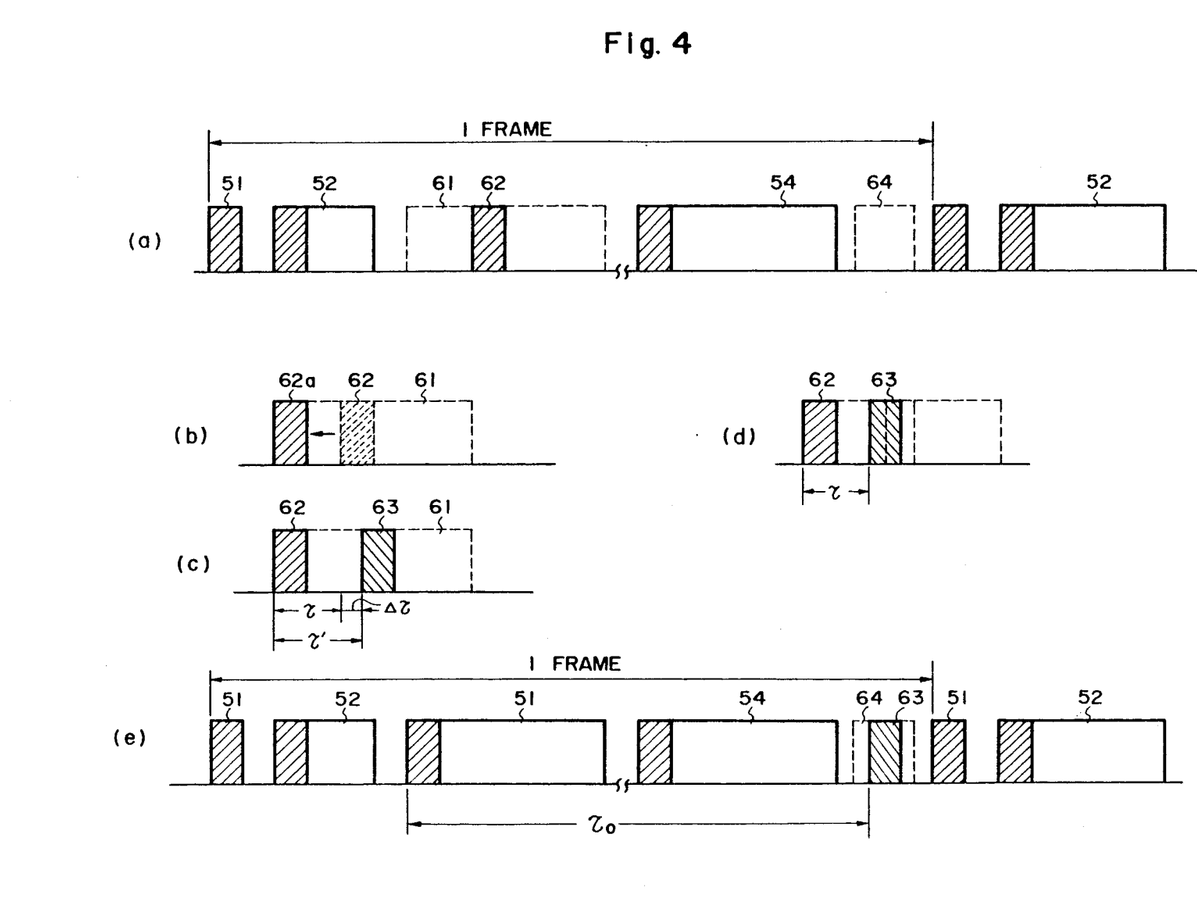
FIG. 4 is a timing chart explanatory of this invention.

Next, the operation of this invention will be concretely described. In the example of FIG. 2, the path A passing through the antenna site A is a main path in operation, whereas the path B passing through the antenna site B is a stand-by path. Let it be assumed that the approximate sending timing is determined by the initial acquisition unit in the path A. To establish the sending burst synchronization, the preamble burst 62 is sent out from the TDMA terminal 8 of FIG. 2 in the time slot 61 for the instant station burst in FIG. 4 via the diversity switching circuit 7, the fixed delay circuit 4, the transmitter 2 and the antenna 1. Next, the preamble burst 62 is shifted to a predetermined position 62a in the assigned time slot according to the aforesaid sending burst synchronizing procedure. This operation is shown in FIGS. 4(a) and (b). In the state of FIG. 4(b), the sending burst synchronization via the path A is already completed and a burst of the data part can be added. In this invention, a sub-burst 63 which is delayed by a time $\tau$ relative to the preamble burst 62 on the TDMA terminal, as shown in FIG. 4(d), is sent out to the path B. Namely, the sub-burst produced in the TDMA terminal 8 is sent out via the diversity switching circuit 7 and the variable delay circuit 9 to the satellite 20 from the antenna site B at the same frequency as the antenna site A. In this instance, if the both path lengths from the TDMA terminal 8 are equal to each other, the time difference $\tau$ between the both bursts is also retained on the satellite 20. As depicted in FIG. 4(c), if the both path lengths are not the same, there exists a difference $\tau'$ between the both bursts received by the satellite 20, and a difference $\tau' - \tau = \Delta\tau$ corresponds to the path-length difference between the both paths. In practice, in the global-beam operation a difference $\Delta\tau$ can be detected by the reception of the bursts returned from the satellite, whereas in the spot-beam operation the difference can be detected by that information of detected reception timings of the preamble burst 62 and the sub-burst 63 which is sent back from a distant terrestrial station. As a result of this, if the difference $\Delta\tau$ is detected, the variable delay circuit 9 is controlled by a control signal from the control circuit 6 until the difference $\Delta\tau$ is reduced to zero, as shown in FIG. 4(d). For example, if the difference $\Delta\tau$ is +1 symbol length of the signal, the delay time of the variable delay circuit 9 is shortened by one symbol length. As a consequence, the path lengths of the both paths are set to be equal, so that the sub-burst 63 is sent out to the path B from a predetermined position in the sub-burst time slot indicated by 64 in FIG. 4(e) and a data part is added to the preamble burst sent out to the path A, thus starting communication. This state is shown in FIG. 4(e).

The above is means for equalizing the path lengths of the both sending paths at the start of communication. Next, a description will be given of means for equalizing the path lengths of the both sending paths during operation. In the diversity system, as the two antenna sites are interconnected via a link line, the path lengths of the both sending paths fluctuate with the lapse of time due to fluctuations in the electrical length of the link line itself and movements of the satellite. Then, to achieve diversity, it is also necessary to equalize both path lengths during operation.

As described above, the sending burst (a communication burst including a data part) of the instant station is sent out to the main path and the sub-burst is sent out to the stand-by path in the preset sub-burst time slot 64 in FIG. 4. The positional relationship between the sending burst and the sub-burst is known on the sending side, as indicated by $\tau_0$ in FIG. 4(e). Accordingly, if the positional relationship between the sending burst and the sub-burst sent out from the instant station is detected to be deviated from $\tau_0$, by means similar to the aforementioned one, after receiving the relative positions of the both bursts in the global-beam operation or on the basis of information sent back from a distant terrestrial station in the slot-beam operation, the variable delay circuit 9 is controlled to reduce the deviation to zero.

Usually, a path-length difference between the both sending paths fluctuates very gently with movements of the satellite 20 or a change in the length of the link line, so that there is no need of sending out the sub-burst at all times. This means that if the number of diversity stations accessible to the same satellite 20 is N, the time slot assigned to one sub-burst can be time shared by the N stations. An example will be described. Now, let it be assumed that a reference station which is sending a reference burst transmits the burst whose reference synchronizing signal pattern composed of "1" and "0" is inverted at certain time intervals. Then, each diversity terrestrial station detects the transmitted signal and, in accordance with a time schedule predetermined on the basis of the polarity inversion timing, each terrestrial station sends out the sub-burst to equalize the both path lengths. In this instance, letting the time intervals of the pattern inversion of the synchronizing signal of the reference burst be represented by T (sec), the time length which can be occupied by each terrestrial station for the equalization of the both path lengths is T/N (sec).

A typical initial acquisition circuit will be described in connection with low-level initial acquisition. The initial acquisition circuit operates at a speed sufficiently lower than a signal speed. This circuit is composed of a PN signal generator which generates a signal at constant intervals, a PSK modem and a correlation detector. A signal transmitted from this circuit is deviated a little in frequency from a main signal. The receiving timing of this signal received via a satellite is measured by the correlator. As a result of this, the time of propagation between a terrestrial station and the satellite is determined on the basis of the sending timing and the receiving timing.

Figure 5:
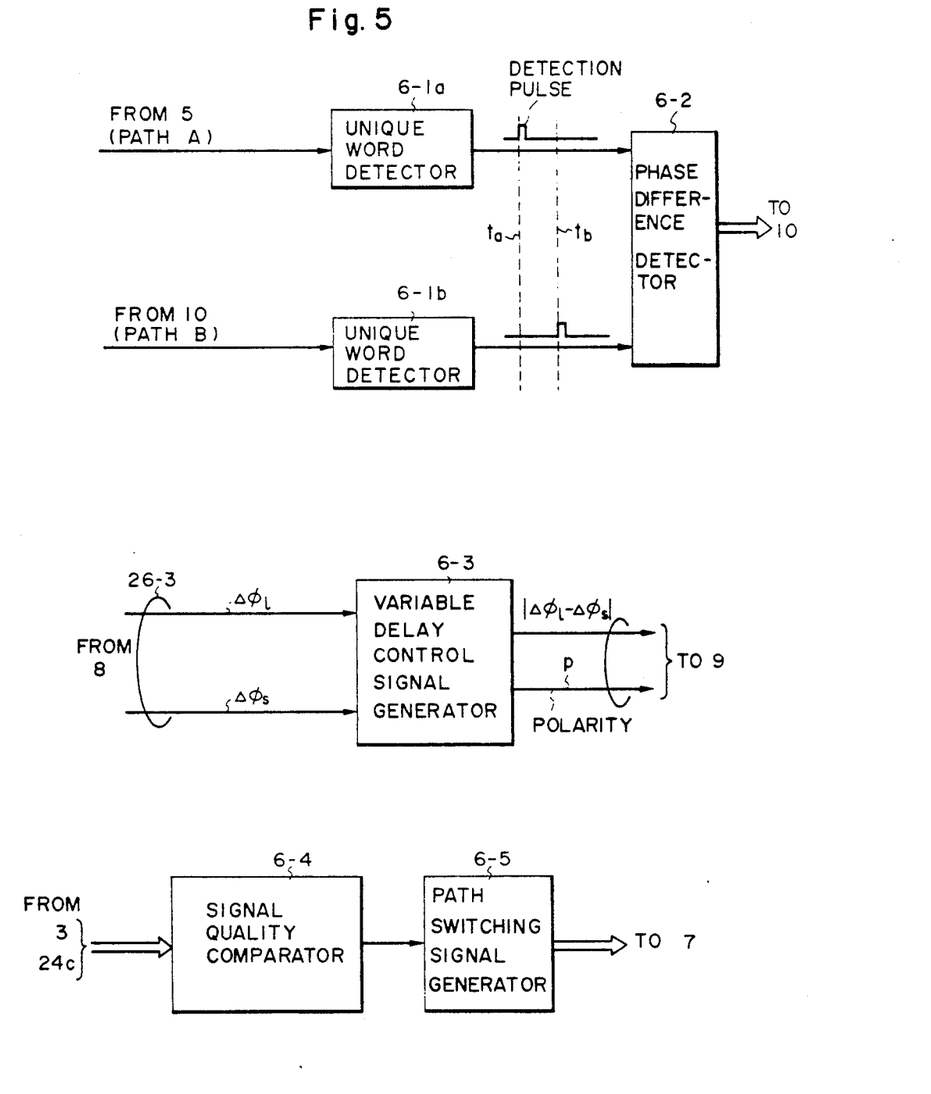
FIG. 5 is a block diagram showing an example of a control circuit for use in this invention.

The control circuit 6 produces a control signal for the diversity switch of the route switching circuit 7 which controls the delays of the variable delay circuits 9 and 10. A delay control signal is produced by detecting the path-length difference of both receiving paths using reference bursts from the both receiving paths immediately before the diversity changeover switch. A control signal for the variable delay circuit 9 for the equalization of the both sending path lengths is produced by burst position information from the TDMA terminal, that is, the information on the positional relationship between the instant station burst and the sub-burst. A diversity switch changeover signal is produced on the basis of switch changeover information, for example, the result of comparison of the received signal quality of the both receiving paths which is achieved by using the CN ratio (the received signal power vs. noise power ratio) of each path or the bit error rate measured in each path.

That is, the delay of the variable delay circuit 10 of the receiving side is determined by detecting a time difference between unique words of the reference bursts from the both receiving paths by unique word detectors 6-1a, 6-1b and a phase difference detector 6-2 immediately before the route switching circuit 7. Each of the unique word detector comprises a correlator. The path lengths are equalized by controlling the delay circuit 10 of the path B so that the position $t_a$ of the detected pulse in the path B coincides with the detected pulse position $t_b$ of the path A in terms of time.

The variable delay in the sending side is produced in the form of ($\Delta\phi_I - \Delta\phi_s$), by a variable delay control signal generator 6-3 comprising a counter counting clock pulses, on the basis of a deviation ($\Delta\phi_I$) of the detected position of the instant station burst synchronizing signal from the TDMA terminal relative to a predetermined position of the instant station burst and a deviation ($\Delta\phi_s$) of the detected position of the sub-burst synchronizing signal relative to a predetermined position of the auxiliary burst. The counter of the circuit 6-3 is reset by the prior one of $\Delta\phi_I$, $\Delta\phi_s$ and counts clock pulses until the other of $\Delta\phi_I$, $\Delta\phi_s$ is received to produce a result $|\Delta\phi_I - \Delta\phi_s|$. The polarity p is determined by detecting, by use of a flip-flop for example, which ($\Delta\phi_I$, $\Delta\phi_s$) is at first received. The path lengths are equalized by controlling the variable delay circuit 9 of the path B so that $\Delta\phi_I$ becomes equal to $\Delta\phi_s$. In the event that the instant station burst or the sub-burst cannot be well received due to rain or the like, the variable delay control of the sending side follows that of the receiving side.

A signal quality comparator 6-4 and a path switching signal generator 6-5 are the same as those employed in ordinary switching diversity. For instance, comparison of the received signal quality of two inputs from the receivers 3 and the line 24c is achieved in the signal quality comparator 6-4 by using the CN ratios or bit error rates of the both receiving paths and, based on the comparison result "1" or "0," a path selection signal is produced from the path switching signal generator 6-5 to select the site A or B.

The above has described this invention in detail with respect to its specific operative embodiment, but the fixed delay circuit and the variable delay circuits in FIG. 2 need not always be provided separately each other. For example, even where the fixed delay circuit and the variable delay circuits are connected in series and only the variable delay circuits are controlled for the path length equalization, the operation of this invention is exactly the same. Further, when the path B is a main path, the sub-burst is naturally sent out to the path A, but equalization of the both sending paths is achieved by controlling the variable delay circuit 9 inserted in the path B.

As has been described in the foregoing, this invention enables, by the use of the sub-burst, easy and accurate equalization of the both sending path lengths at the time of path length setting of a diversity terrestrial station. Moreover, during operation, the path length equalization of a plurality of diversity terrestrial stations accessible to the same satellite and the sending burst synchronization during diversity operation can be performed easily and accurately only by setting the time slot for the sub-burst in one frame of TDMA. Hence, this invention is of great utility in the operation of the diversity system.

Besides, it is needless to say that this invention is also applicable to a space diversity using three or more antenna sites, by time sharing the sub-burst in the sending path forming each diversity.

What we claim is:

1. A space diversity system in a TDMA communication system employing a communication satellite including: equalizing means for equalizing the path lengths of respective sending paths at the start of communication; said equalizing means comprising pre-burst sending means for sending a pre-burst out to one of the paths making up the diversity system in a time slot of one frame assigned to an instant station; sub-burst sending means for sending a sub-burst out to the other of the paths in the assigned time slot; time difference detecting means for detecting a relative time difference between the pre-burst and the sub-burst from signals sent back to the instant station from the communication satellite or signals received by a distant terrestrial station via the communication satellite; comparison means for comparing a relative time difference between the pre-burst and the sub-burst at the time of their sending-out from the instant station with a relative time difference between the pre-burst and the sub-burst received via the communication satellite; and variable delay means inserted in one of the paths and controlled by said comparison means so that the two relative time differences become equal to each other.

2. A space diversity system in a TDMA communication system employing a communication satellite including: equalizing means for equalizing the path lengths of respective sending paths at the start of communication; said equalizing means comprising pre-burst sending means for sending a pre-burst out to one of the paths making up the diversity system in a time slot of one frame assigned to an instant station; sub-burst sending means for sending a sub-burst out to the other of the paths in the assigned time slot; time distance detecting means for detecting a relative time difference between the pre-burst and the sub-burst from signals sent back to the instant station from the communication satellite or signals received by a distant terrestrial station via the communication satellite; comparison means for comparing a relative time difference between the pre-burst and the sub-burst at the time of their sending-out from the instant station with a relative time difference between the pre-burst and the sub-burst received via the communication satellite, variable delay means inserted in one of the paths and controlled by said comparison means so that the two relative time differences become equal to each other; wherein after the path length equalization at the start of communication, a signal transmitting burst is sent out to a path in operation in the time slot assigned to the station, while a sub-burst is sent out to a stand-by path of diversity in a sub-burst time slot of the frame for each frame or on a time shared basis; wherein relative time difference between the signal transmitting burst and sub-burst is detected from signals sent back to the station via the communication satellite; and wherein when the detected relative time difference is different from a predetermined relative time difference between the signal transmitting burst and the sub-burst at the time of their sending-out, said variable delay means inserted in one of the paths is controlled so that the two relative time differences become equal to each other.

* * * * *